(12) United States Patent
Yu et al.

(10) Patent No.: US 10,026,992 B2
(45) Date of Patent: Jul. 17, 2018

(54) ADDITIVE FOR NON-AQUEOUS ELECTROLYTE, NON-AQUEOUS ELECTROLYTE COMPRISING THE SAME, AND LITHIUM SECONDARY BATTERY COMPRISING THE SAME

(71) Applicant: LG Chem, Ltd., Seoul (KR)

(72) Inventors: Sung Hoon Yu, Daejeon (KR); Hyun Yeong Lee, Daejeon (KR); Yoo Sun Kang, Daejeon (KR); Kyung Mi Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/341,034

(22) Filed: Nov. 2, 2016

(65) Prior Publication Data

US 2017/0125846 A1    May 4, 2017

(51) Int. Cl.
*H01M 10/0567* (2010.01)
*H01M 10/0525* (2010.01)
*H01M 10/0568* (2010.01)
*H01M 10/0569* (2010.01)
*H01M 10/052* (2010.01)

(52) U.S. Cl.
CPC ..... *H01M 10/0567* (2013.01); *H01M 10/052* (2013.01); *H01M 10/0525* (2013.01); *H01M 10/0568* (2013.01); *H01M 10/0569* (2013.01); *H01M 2300/0025* (2013.01)

(58) Field of Classification Search
CPC .......... H01M 10/0569; H01M 10/052; H01M 10/0567; H01M 10/0525; H01M 10/0568; H01M 2300/0025
See application file for complete search history.

(56) References Cited

FOREIGN PATENT DOCUMENTS

KR    20140082565 A    7/2014

*Primary Examiner* — Jane Rhee
(74) *Attorney, Agent, or Firm* — Lerner, David, Littenberg, Krumholz & Mentlik, LLP

(57) ABSTRACT

The present invention relates to an additive for a non-aqueous electrolyte solution which may improve overcharge safety, a non-aqueous electrolyte solution for a lithium secondary battery including the same, and a lithium secondary battery including the non-aqueous electrolyte solution.

11 Claims, 1 Drawing Sheet

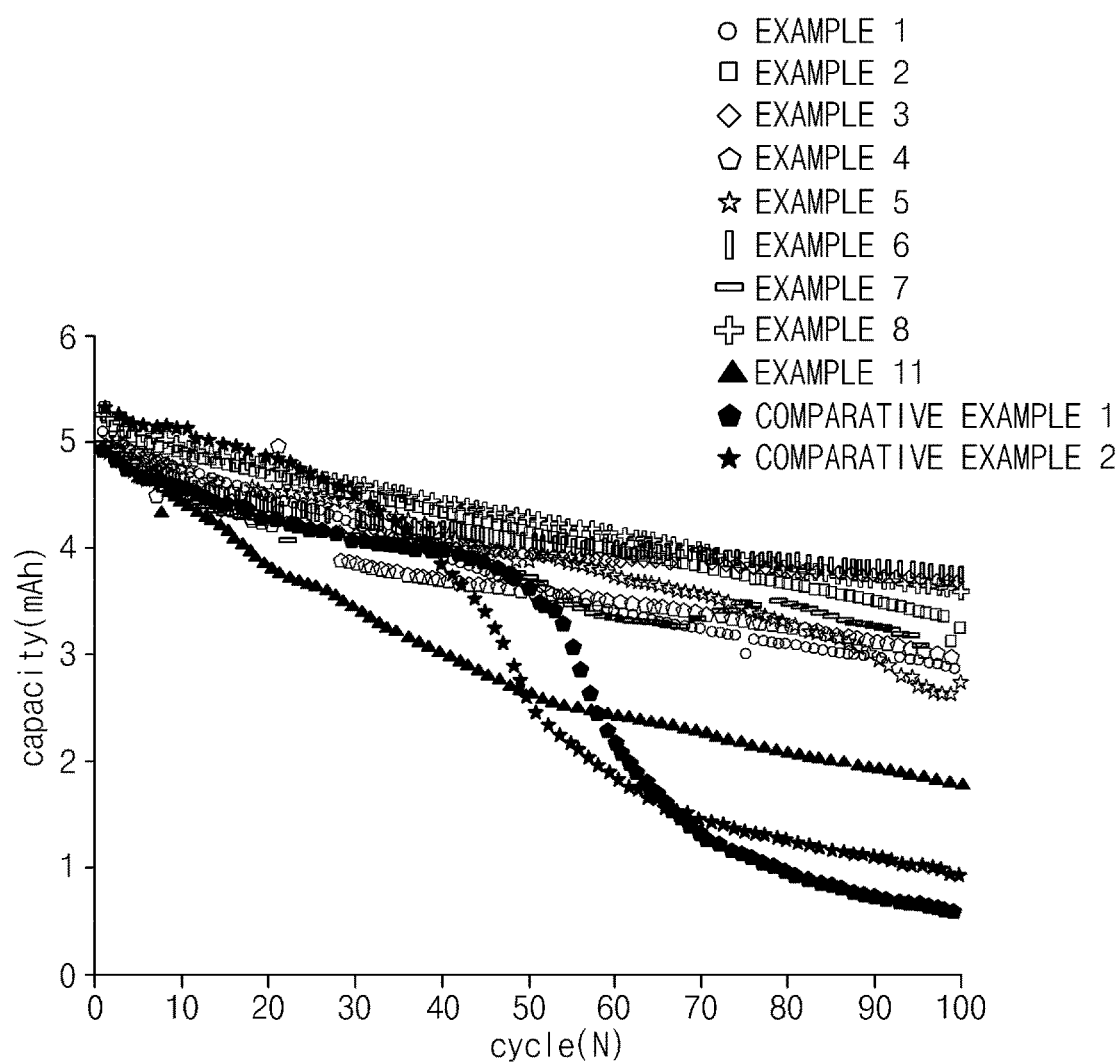

ADDITIVE FOR NON-AQUEOUS ELECTROLYTE, NON-AQUEOUS ELECTROLYTE COMPRISING THE SAME, AND LITHIUM SECONDARY BATTERY COMPRISING THE SAME

CROSS-REFERENCE TO RELATED APPLICATIONS

This application claims the benefit of Korean Patent Application No. 10-2015-154073, filed on Nov. 3, 2015, in the Korean Intellectual Property Office, the disclosure of which is incorporated herein in its entirety by reference.

TECHNICAL FIELD

The present invention relates to an additive for a non-aqueous electrolyte solution, a non-aqueous electrolyte solution comprising the same, and a lithium secondary battery comprising the non-aqueous electrolyte solution, and more particularly, to an additive for a non-aqueous electrolyte solution containing at least two cyano groups (—CN), a non-aqueous electrolyte solution capable of securing high-voltage stability by comprising the same, and a lithium secondary battery comprising the non-aqueous electrolyte solution.

BACKGROUND ART

Recently, interests in energy storage technologies have been increasingly grown, and, while the application of the energy storage technologies is expanded to mobile phones, camcorders, notebook PCs, and even to electric vehicles, efforts for research and development of electrochemical devices have been gradually materialized.

The electrochemical devices have received most attention in this respect, and there emerges an interest in rechargeable secondary batteries among these electrochemical devices. Particularly, among the currently used secondary batteries, lithium secondary batteries, developed in the early 1990's, are spotlighted because the lithium secondary batteries may have higher operating voltage and significantly higher energy density.

The lithium secondary batteries are composed of a negative electrode formed of such as a carbon material capable of intercalating and deintercalating lithium ions, a positive electrode formed of such as a lithium-containing oxide, and a non-aqueous electrolyte solution.

The lithium secondary batteries may be categorized into a lithium ion liquid battery (LiLB) using a liquid electrolyte, a lithium ion polymer battery (LiPB) using a gel-type polymer electrolyte, and a lithium polymer battery (LPB) using a solid polymer electrolyte according to a type of the electrolyte used.

Recently, as the application range of the lithium secondary batteries has expanded, there is a growing demand for lithium secondary batteries which may be safely charged even at a high voltage while maintaining excellent cycle life characteristics even in more harsh environments such as a high temperature or low temperature environment and high-voltage charging.

However, the lithium secondary battery using a liquid electrolyte may have limitations in that a structure of the battery may be deformed due to the generation of gas caused by the oxidation of the electrolyte during long-term storage at high temperatures, or fire and explosion of the battery may occur due to internal heating caused by overcharging. For example, a positive electrode structure collapses while the voltage increases during the overcharging, and accordingly, the negative electrode is degraded while metal ions dissolved from the surface of the positive electrode are electrodeposited on the negative electrode. Such a battery performance degradation phenomenon tends to be more accelerated when the potential of the positive electrode is increased or the battery is exposed at high temperatures.

In order to address the above-described limitations, a method has been proposed in which a material, which protects the positive electrode by forming a film on the positive electrode, is added to the electrolyte solution.

DISCLOSURE OF THE INVENTION

Technical Problem

An aspect of the present invention provides an additive for a non-aqueous electrolyte solution which may improve overcharge safety.

Another aspect of the present invention provides a non-aqueous electrolyte solution for a lithium secondary battery which comprises the additive for a non-aqueous electrolyte solution.

Another aspect of the present invention provides a lithium secondary battery in which cycle characteristics and high-temperature storage performance are improved even during high-voltage charging by comprising the above non-aqueous electrolyte solution.

Technical Solution

According to an aspect of the present invention, there is provided an additive for a non-aqueous electrolyte solution including a compound represented by Formula 1:

[Formula 1]

in Formula 1, $R_1$ and $R_2$ are each independently a substituted or unsubstituted alkylene group having 1 to 5 carbon atoms, and X is hydrogen (H), a substituted or unsubstituted alkyl group having 1 to 6 carbon atoms, or —$(R_3)_n$—CN, wherein $R_3$ is a substituted or unsubstituted alkylene group having 1 to 3 carbon atoms, and n is an integer of 0 or 1.

According to another aspect of the present invention, there is provided a non-aqueous electrolyte solution for a lithium secondary battery including an ionizable lithium salt; an organic solvent; and the additive for a non-aqueous electrolyte solution.

According to another aspect of the present invention, there is provided a lithium secondary battery including a negative electrode, a positive electrode, a separator disposed between the negative electrode and the positive electrode, and the non-aqueous electrolyte solution of the present invention.

Advantageous Effects

Since the present invention provides an additive for a non-aqueous electrolyte solution which may suppress a decomposition reaction of the electrolyte solution by forming a more stable ionic conductive film on the surface of a positive electrode, a lithium secondary battery having improved cycle life characteristics and high-temperature storage safety at high temperature and high voltage may be prepared by suppressing the decomposition reaction of the electrolyte solution.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating life characteristics of lithium secondary batteries according to Experimental Example 1 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As described above, when the overcharge of a secondary battery occurs, a structure of a positive electrode active material becomes unstable while an excessive amount of lithium ions are discharged from a positive electrode. A decomposition reaction of an electrolyte solution occurs while oxygen is discharged from the positive electrode active material having the unstable structure. Particularly, under a high temperature condition, the dissolution of metal ions from the positive electrode may be increased, and performance of the battery may be degraded when the metal ions are precipitated on a negative electrode.

Thus, an embodiment of the present invention aims at providing an additive for a non-aqueous electrolyte solution which may improve overcharge safety of the electrolyte solution.

Also, the present invention provides a non-aqueous electrolyte solution for a lithium secondary battery including the additive for a non-aqueous electrolyte solution.

Furthermore, the present invention provides a lithium secondary battery in which cycle characteristics and high-temperature storage performance are improved even during high-voltage charging by including the above non-aqueous electrolyte solution.

Specifically, an embodiment of the present invention provides an additive for a non-aqueous electrolyte solution which includes a compound represented by Formula 1 below:

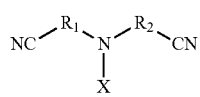

[Formula 1]

in Formula 1, $R_1$ and $R_2$ are each independently a substituted or unsubstituted alkylene group having 1 to 5 carbon atoms, and X is hydrogen (H), a substituted or unsubstituted alkyl group having 1 to 6 carbon atoms, or $-(R_3)_n-CN$, where $R_3$ is a substituted or unsubstituted alkylene group having 1 to 3 carbon atoms, and n is an integer of 0 or 1.

Specifically, the additive for a non-aqueous electrolyte solution may include at least one compound selected from the group consisting of compounds represented by Formulae 1a to 1h below.

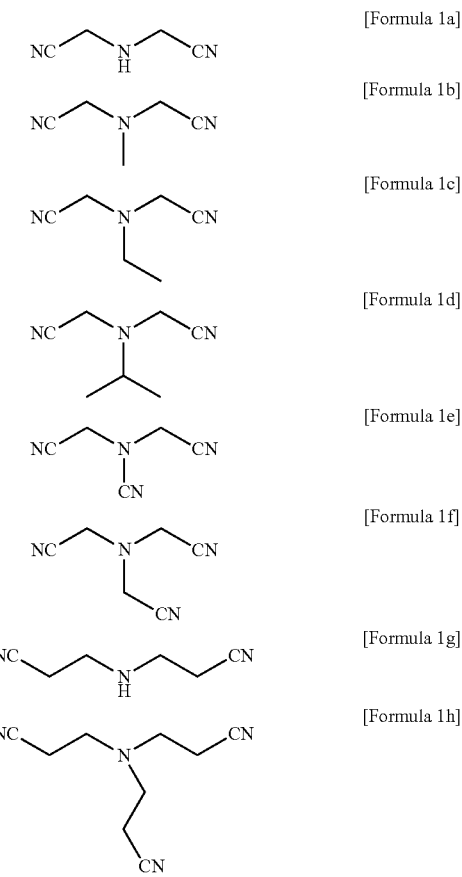

Particularly, the additive for a non-aqueous electrolyte solution may include at least one compound selected from the group consisting of the compounds represented by Formulae 1b to 1d, and, for example, may include at least one compound selected from the group consisting of the compounds represented by Formulae 1c and 1d.

In general, during initial charging of a secondary battery, a solid electrolyte interface (SEI) film affecting a battery reaction is formed on a surface of a negative electrode (graphite) while an electrolyte solution is decomposed before lithium ions discharged from a positive electrode are inserted into the negative electrode (graphite). The SEI film not only has properties of passing the lithium ions and blocking the movement of electrons, but also plays a role as a protective film which prevents the continuous decomposition of the electrolyte solution. However, performance of the formed SEI film may be difficult to be continuously maintained, and the SEI film may be destroyed by shrinkage and expansion due to repeated charge/discharge cycles or may be destroyed by external impact and heat. While the SEI film thus destroyed is restored by the continuous charge and discharge process, the charge is additionally or irreversible consumed to result in a continuous decrease in reversible capacity. Particularly, since interface resistance is increased as the thickness of the solid interface film formed by the decomposition of the electrolyte solution is increased, battery performance is degraded.

The additive for a non-aqueous electrolyte solution, which includes at least one compound selected from the group consisting of the compounds containing at least two cyano groups (—CN), according to the present invention, may form a stable ionic conductive film on a surface of the positive electrode when a predetermined voltage is reached during the charging and discharging. Since the ionic conductive film prevents the dispersion of metal ions dissolved from a positive electrode active material, the ionic conductive film suppresses the decomposition reaction of the electrolyte solution by preventing the contact between the positive electrode and the electrolyte solution. Also, since the additive for a non-aqueous electrolyte solution of the present invention includes a functional group such as the cyano group, salt anions are stabilized by unshared electron pairs, and thus, the decomposition reaction of the electrolyte solution may be suppressed. Particularly, the additive for a non-aqueous electrolyte solution of the present invention may suppress the movement of the metal ions dissolved from the positive electrode to the negative electrode by adsorbing the metal ions even in a state in which the film is not formed. Thus, since the additive for a non-aqueous electrolyte solution may improve safety of the secondary battery during overcharging and may effectively suppress the decomposition reaction of the electrolyte solution even during high-temperature storage, a lithium secondary battery having improved cycle characteristics may be prepared.

Furthermore, with respect to the compounds represented by Formulae 1a to 1h which are included in the additive for a non-aqueous electrolyte solution of the present invention, since a nitrogen (N) element in the compounds has an unshared electron pair, it has an adsorption effect on the dissolved metal ions. However, in a case in which an electron withdrawing group is directly or indirectly bonded to the nitrogen element, the metal ion adsorption effect may be relatively reduced. For example, with respect to a compound, in which hydrogen is bonded to the nitrogen element, such as the compounds represented by Formulae 1a and 1g among the compounds represented by Formulae 1a to 1h, since the compound is electrochemically unstable, the metal ion adsorption effect is relatively lower than a case in which nitrogen is substituted with an alkyl group, such as the compounds represented by Formulae 1b to 1d. Also, in a case in which a functional group containing a cyano group is further bonded to the nitrogen element, such as the compounds represented by Formulae 1e, 1f, and 1h, metal ion adsorption capacity of nitrogen may be relatively reduced in comparison to the compounds represented by Formulae 1b to 1d. Thus, the effect of the additive for a non-aqueous electrolyte solution may be different depending on the included compound during the high-temperature storage in which the dissolution of the metal ions is intensified.

Also, an embodiment of the present invention provides a non-aqueous electrolyte solution for a lithium secondary battery including an ionizable lithium salt; an organic solvent; and an additive for a non-aqueous electrolyte solution, wherein the additive for a non-aqueous electrolyte solution includes at least one compound selected from the group consisting of the compounds represented by Formulae 1a to 1h.

In this case, the additive for a non-aqueous electrolyte solution may be included in an amount of about 0.5 wt % to about 6 wt %, particularly 1 wt % to 5 wt %, based on a total weight of the non-aqueous electrolyte solution. When the amount of the additive is less than 0.5 wt %, stabilizing effect of the SEI film is insufficient. Also, when the amount of the additive is greater than 6 wt %, for example, when the amount of the additive is about 7 wt %, since the additive, which may suppress the dissolution of metal during the overcharging, is excessively included, the overcharge safety may be improved, but life characteristics may be reduced due to an increase in resistance.

In the non-aqueous electrolyte solution of the present invention, the lithium salt, which is included as an electrolyte, may be used without limitation so long as it is typically used in an electrolyte solution for a lithium secondary battery. For example, the lithium salt may include $Li^+$ as a cation, and may include any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3S\ O_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in a mixture of two or more thereof, if necessary.

The organic solvent included in the non-aqueous electrolyte solution of the present invention may be used without limitation so long as it is typically used in an electrolyte solution for a lithium secondary battery, and, for example, an ether compound, an ester compound, an amide compound, a linear carbonate compound, or a cyclic carbonate compound may be used alone or in a mixture of two or more thereof. Among these compounds, the cyclic carbonate compound, the linear carbonate compound, or a mixture thereof may be typically included.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

In particular, since ethylene carbonate and propylene carbonate, as cyclic carbonates among the carbonate-based organic solvents, are highly viscous organic solvents and have high dielectric constants, the ethylene carbonate and propylene carbonate may well dissociate the lithium salt in the electrolyte. Thus, the ethylene carbonate and propylene carbonate may be used. Since an electrolyte solution having high electrical conductivity may be prepared when the above cyclic carbonate is mixed with low viscosity, low dielectric constant linear carbonate, such as dimethyl carbonate and diethyl carbonate, in an appropriate ratio, the ethylene carbonate and propylene carbonate, for example, may be used.

Also, as the ether compound among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound among the organic solvents, any one selected from the group consisting of liner esters such as methyl acetate, ethyl acetate, propyl acetate, methyl propionate, ethyl propionate, propyl propionate, and butyl propionate; and cyclic ester compounds such as γ-butyrolactone, γ-valerolactone, γ-caprolactone, σ-valerolactone, and ε-caprolactone, or a mixture of two or more thereof may be used, but the present invention is not limited thereto.

Also, according to an embodiment of the present invention, there is provided a lithium secondary battery including a positive electrode, a negative electrode, a separator disposed between the positive electrode and the negative electrode, and a non-aqueous electrolyte solution, wherein the above non-aqueous electrolyte solution includes the non-aqueous electrolyte solution of the present invention.

Specifically, the lithium secondary battery of the present invention may be prepared by injecting the non-aqueous electrolyte solution of the present invention into an electrode assembly which is composed of the positive electrode, the negative electrode, and the separator disposed between the positive electrode and the negative electrode. In this case, those typically used in the preparation of the lithium secondary battery may all be used as the positive electrode, the negative electrode, and the separator which constitute the electrode assembly.

In this case, the positive electrode may be prepared by coating a positive electrode material mixture including a positive electrode active material, a binder, a conductive agent, and a solvent on a positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of the positive electrode material mixture.

The binder is a component that assists in the binding between the active material and the conductive agent and in the binding with the current collector, wherein the binder is commonly added in an amount of 1 wt % to 30 wt % based on the total weight of the positive electrode material mixture.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the positive electrode material mixture.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of solid content including the positive electrode active material as well as selectively the binder and the conductive agent is in a range of 50 wt % to 95 wt %, for example, 70 wt % to 90 wt %.

The negative electrode, for example, may be prepared by coating a negative electrode material mixture including a negative electrode active material, a binder, a conductive agent, and a solvent on a negative electrode collector.

The negative electrode collector generally has a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, like the positive electrode collector, the negative electrode collector may have fine surface roughness to improve bonding strength with the negative electrode active material. The negative electrode collector may have various shapes such as a film, a sheet, a foil, a net, a porous body, a foam body, a non-woven fabric body, and the like.

The negative electrode active material may include at least one negative electrode active material selected from the group consisting of a carbonaceous material such as natural graphite and artificial graphite; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides of the metals (Me); and composites of the metals (Me) and carbon.

The negative electrode active material may be included in an amount of 80 wt % to 99 wt % based on a total weight of the negative electrode material mixture.

The binder is a component that assists in the binding between the conductive agent, the active material, and the current collector, wherein the binder is commonly added in an amount of 1 wt % to 30 wt % based on the total weight of the negative electrode material mixture. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is a component for further improving the conductivity of the negative electrode active material, wherein the conductive agent may be added in an amount of 1 wt % to 20 wt % based on the total weight of the negative electrode material mixture. Any conductive agent may be used without particular limitation so long as it has suitable conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include an organic solvent, such as N-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in a range of 50 wt % to 95 wt %, for example, 70 wt % to 90 wt %.

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, and a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

Fluoroethylene carbonate (FEC), propylene carbonate (PC), and ethylmethyl carbonate (EMC) were mixed in a ratio of 30:10:60 (vol %) to prepare an organic solvent mixed solution. Thereafter, 0.5 wt % of the compound represented by Formula 1a was further added based on a total weight of the prepared organic solvent mixed solution, and a non-aqueous electrolyte solution was prepared by dissolving $LiPF_6$ in the mixed solution to obtain a $LiPF_6$ concentration of 1 M.

(Positive Electrode Preparation)

40 parts by weight of a mixture, in which a positive electrode active material (lithium cobalt composite oxide; $LiCO_2$), a conductive agent (carbon black), and a binder (polyvinylidene fluoride; PVDF) were mixed in a ratio of 90:5:5 (wt %), was added based on 100 parts by weight of N-methyl-2-pyrrolidone (NMP), as a solvent, to prepare a positive electrode material mixture. A 100 μm thick positive electrode collector (Al thin film) was coated with the positive electrode material mixture, dried, and roll-pressed to prepare a positive electrode.

(Negative Electrode Preparation)

90 parts by weight of a mixture, in which natural graphite, a binder (PVDF), and a conductive agent (carbon black) were mixed in a ratio of 95:2:3 (wt %), was added based on 100 parts by weight of N-methyl-2-pyrrolidone (NMP), as a solvent, to prepare a negative electrode material mixture. A 90 μm thick negative electrode collector (Cu thin film) was coated with the negative electrode material mixture, dried, and roll-pressed to prepare a negative electrode.

(Secondary Battery Preparation)

A coin-type cell was prepared by a typical method in which the positive electrode and negative electrode prepared by the above-described method were sequentially stacked with a polyethylene porous film, and a lithium secondary battery (battery capacity 5.5 mAh) was then prepared by injecting the prepared non-aqueous electrolyte solution thereinto.

Example 2

A non-aqueous electrolyte solution and a lithium secondary battery including the same were prepared in the same manner as in Example 1 except that the compound represented by Formula 1b, instead of the compound represented by Formula 1a, was included as an additive for a non-aqueous electrolyte solution in the preparation of the non-aqueous electrolyte solution in Example 1.

Example 3

A non-aqueous electrolyte solution and a lithium secondary battery including the same were prepared in the same manner as in Example 1 except that the compound represented by Formula 1c, instead of the compound represented by Formula 1a, was included as an additive for a non-aqueous electrolyte solution in the preparation of the non-aqueous electrolyte solution in Example 1.

Example 4

A non-aqueous electrolyte solution and a lithium secondary battery including the same were prepared in the same manner as in Example 1 except that the compound represented by Formula 1d, instead of the compound represented by Formula 1a, was included as an additive for a non-aqueous electrolyte solution in the preparation of the non-aqueous electrolyte solution in Example 1.

Example 5

A non-aqueous electrolyte solution and a lithium secondary battery including the same were prepared in the same manner as in Example 1 except that the compound represented by Formula 1e, instead of the compound represented by Formula 1a, was included as an additive for a non-aqueous electrolyte solution in the preparation of the non-aqueous electrolyte solution in Example 1.

Example 6

A non-aqueous electrolyte solution and a lithium secondary battery including the same were prepared in the same manner as in Example 1 except that the compound represented by Formula 1f, instead of the compound represented by Formula 1a, was included as an additive for a non-aqueous electrolyte solution in the preparation of the non-aqueous electrolyte solution in Example 1.

Example 7

A non-aqueous electrolyte solution and a lithium secondary battery including the same were prepared in the same manner as in Example 1 except that the compound represented by Formula 1g, instead of the compound represented by Formula 1a, was included as an additive for a non-aqueous electrolyte solution in the preparation of the non-aqueous electrolyte solution in Example 1.

Example 8

A non-aqueous electrolyte solution and a lithium secondary battery including the same were prepared in the same manner as in Example 1 except that the compound represented by Formula 1h, instead of the compound represented by Formula 1a, was included as an additive for a non-aqueous electrolyte solution in the preparation of the non-aqueous electrolyte solution in Example 1.

Example 9

A non-aqueous electrolyte solution and a lithium secondary battery including the same were prepared in the same manner as in Example 1 except that 5 wt % of the compound represented by Formula 1b was included in the preparation of the non-aqueous electrolyte solution in Example 2.

Example 10

A non-aqueous electrolyte solution and a lithium secondary battery including the same were prepared in the same manner as in Example 4 except that 5 wt % of the compound represented by Formula 1d was included in the preparation of the non-aqueous electrolyte solution in Example 4.

Example 11

A non-aqueous electrolyte solution and a lithium secondary battery including the same were prepared in the same manner as in Example 1 except that 7 wt % of the compound represented by Formula 1a was included as an additive in the preparation of the non-aqueous electrolyte solution.

Example 12

A non-aqueous electrolyte solution and a lithium secondary battery including the same were prepared in the same manner as in Example 1 except that 7 wt % of the compound represented by Formula 1b was included as an additive in the preparation of the non-aqueous electrolyte solution.

Example 13

A non-aqueous electrolyte solution and a lithium secondary battery including the same were prepared in the same manner as in Example 1 except that 7 wt % of the compound represented by Formula 1d was included as an additive in the preparation of the non-aqueous electrolyte solution.

Comparative Example 1

A non-aqueous electrolyte solution and a lithium secondary battery including the same were prepared in the same manner as in Example 1 except that an additive for a non-aqueous electrolyte solution was not included in the preparation of the non-aqueous electrolyte solution in Example 1.

Comparative Example 2

A non-aqueous electrolyte solution and a lithium secondary battery including the same were prepared in the same manner as in Example 1 except that the following Formula 2 was added as an additive for a non-aqueous electrolyte solution in the preparation of the non-aqueous electrolyte solution in Example 1.

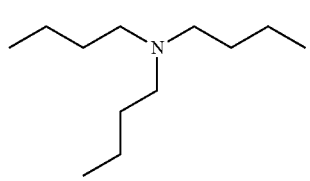

[Formula 2]

EXPERIMENTAL EXAMPLES

Experimental Example 1: Life Characteristics

The batteries (battery capacity: 5.5 mAh) prepared in Examples 1 to 8 and Comparative Examples 1 and 2 were charged at a constant current of 0.7 C to a voltage of 4.35 V at 60° C. Thereafter, the batteries were charged at a constant voltage of 4.35 V and the charge was terminated when a charge current became 0.275 mA. After the batteries were left standing for minutes, the batteries were discharged at a constant current of 0.5 C to a voltage of 3.0 V. The charge and discharge were repeated for 100 cycles and battery capacities were then measured. The results thereof are presented in FIG. 1.

Herein, the expression "C" represents a C-rate, a charge/discharge current rate of a battery expressed by ampere (A), wherein it is typically expressed as a battery capacity ratio. That is, 1C for the previously prepared batteries means a current of 5.5 mA.

As illustrated in FIG. 1, it may be understood that life characteristics of the secondary batteries of Examples 1 to 8 and 11 after 60 cycles were better than those of the batteries of Comparative Examples 1 and 2.

However, with respect to the secondary battery of Example 11, it may be confirmed that the life characteristics were better than those of Comparative Examples 1 and 2, but the life characteristics were relatively reduced in comparison to those of the secondary batteries of Examples 1 to 8 in which the amount of the additive was 6 wt % or less.

Experimental Example 2: Co Ion Electrodeposition Experiment

The lithium secondary batteries prepared in Examples 1 to 13 and Comparative Examples 1 and 2 were charged and discharged in the same manner as in Experimental Example 1, a concentration of Co ions dissolved was measured by inductively coupled plasma (ICP) analysis, and comparison results are presented in Table 1 below.

Experimental Example 3: Overcharge Safety Measurement

The lithium secondary batteries prepared in Examples 1 to 13 and Comparative Examples 1 and 2 were charged at a 0.8 C rate to 4.35 V under a constant current/constant voltage condition, cut-off charged at 0.05 C, and discharged at 0.5 C to a voltage of 3.0 V.

Thereafter, the batteries were overcharged at 0.8 C to a voltage of 10 V. The battery was evaluated as "OK" only when there were no ignition, explosion, and electrolyte leakage of the battery after the overcharge, and the battery was evaluated as "x" when the ignition or electrolyte leakage of the battery was intensified. The results thereof are presented in Table 1 below.

TABLE 1

| | Additive | | | Overcharge |
|---|---|---|---|---|
| | Formula | Content | Co (ppm) | safety |
| Example 1 | 1a | 0.5 wt % | 40 | OK |
| Example 2 | 1b | 0.5 wt % | 36 | OK |
| Example 3 | 1c | 0.5 wt % | 31 | OK |
| Example 4 | 1d | 0.5 wt % | 42 | OK |
| Example 5 | 1e | 0.5 wt % | 50 | OK |
| Example 6 | 1f | 0.5 wt % | 33 | OK |
| Example 7 | 1g | 0.5 wt % | 45 | OK |
| Example 8 | 1h | 0.5 wt % | 24 | OK |
| Example 9 | 1b | 5 wt % | 50 | OK |
| Example 10 | 1d | 5 wt % | 45 | OK |
| Example 11 | 1a | 7 wt % | 105 | OK |
| Example 12 | 1b | 7 wt % | 115 | OK |

TABLE 1-continued

| | Additive | | | Overcharge |
|---|---|---|---|---|
| | Formula | Content | Co (ppm) | safety |
| Example 13 | 1d | 7 wt % | 108 | OK |
| Comparative Example 1 | — | | 186 | X |
| Comparative Example 2 | 2 | 0.5 wt % | 101 | X |

As illustrated in Table 1, it may be confirmed that all of the batteries of Examples 1 to 13 had excellent overcharge safety, but overcharge safeties of the secondary batteries of Comparative Examples 1 and 2 were worse than those of the secondary batteries of the examples. In particular, it may be confirmed that metal dissolution concentrations of the secondary batteries of Examples 1 to 10 were significantly reduced in comparison to those of the secondary batteries of Comparative Examples 1 and 2.

Experimental Example 4: High-temperature Storage Performance Measurement

The secondary batteries prepared in Examples 1 to 10 and Comparative Example 1 were charged at a 0.8 C rate to 4.35 V under a constant current/constant voltage condition, cut-off charged at 0.05 C, and discharged at 0.5 C to a voltage of 3.0 V (initial discharge capacity). Again, the secondary batteries were charged at a 0.8 C rate to 4.35 V under a constant current/constant voltage condition, cut-off charged at 0.05 C, and stored at 60° C. for 2 weeks. Thereafter, the batteries were discharged at 0.5 C to a voltage of 3.0 V at room temperature and discharge capacities were measured (residual discharge capacities). Again, the batteries were charged at a 0.8 C rate to 4.35 V under a constant current/constant voltage condition, cut-off charged at 0.05 C, and discharged at 0.5 C to a voltage of 3.0 V to measure discharge capacities (recovery discharge capacities). The results thereof are presented in Table 2 below. In this case, the residual discharge capacities and the recovery discharge capacities were expressed as a percentage (%) relative to the initial discharge capacity.

TABLE 2

| | Additive | | Residual discharge | Recovery discharge |
|---|---|---|---|---|
| | Formula | Content | capacity (%) | capacity (%) |
| Example 1 | 1a | 0.5 wt % | 72 | 87 |
| Example 2 | 1b | 0.5 wt % | 88 | 96 |
| Example 3 | 1c | 0.5 wt % | 86 | 96 |
| Example 4 | 1d | 0.5 wt % | 85 | 94 |
| Example 5 | 1e | 0.5 wt % | 75 | 88 |
| Example 6 | 1f | 0.5 wt % | 75 | 86 |
| Example 7 | 1g | 0.5 wt % | 74 | 86 |
| Example 8 | 1h | 0.5 wt % | 80 | 90 |
| Example 9 | 1b | 5 wt % | 89 | 95 |
| Example 10 | 1d | 5 wt % | 88 | 96 |
| Comparative Example 1 | — | | 58 | 77 |

As illustrated in Table 2, it may be understood that both of the residual discharge capacities and recovery discharge capacities at high temperatures of the secondary batteries of Examples 1 to 10, which include the non-aqueous electrolyte solutions in which the additive for an aqueous electrolyte solution of the present invention was included, were better than those of the secondary battery of Comparative Example 1 including the non-aqueous electrolyte solution in which the additive was not used. In particular, with respect to the secondary batteries of Examples 2, 3, 4, 9, and 10 which include the non-aqueous electrolyte solutions including the additive for an aqueous electrolyte solution configured to include the compounds represented by Formulae 1b to 1d, it may be understood that the residual discharge capacities and recovery discharge capacities at high temperatures were particularly excellent.

The invention claimed is:

1. An additive for a non-aqueous electrolyte solution, the additive comprising a compound represented by Formula 1:

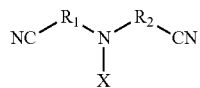

[Formula 1]

in Formula 1,

R$_1$ and R$_2$ are each independently a substituted or unsubstituted alkylene group having 1 to 5 carbon atoms, and X is hydrogen (H), a substituted or unsubstituted alkyl group having 1 to 6 carbon atoms, or —(R$_3$)$_n$—CN, wherein R$_3$ is a substituted or unsubstituted alkylene group having 1 to 3 carbon atoms, and n is an integer of 0 or 1.

2. The additive for a non-aqueous electrolyte solution of claim 1, comprising at least one compound selected from the group consisting of compounds represented by Formulae 1a to 1h:

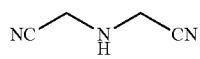

[Formula 1a]

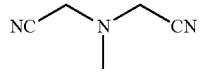

[Formula 1b]

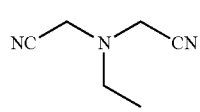

[Formula 1c]

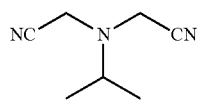

[Formula 1d]

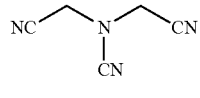

[Formula 1e]

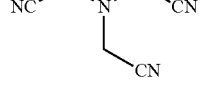

[Formula 1f]

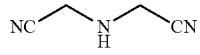

[Formula 1g]

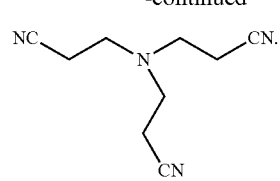

[Formula 1h]

3. The additive for a non-aqueous electrolyte solution of claim 1, comprising at least one compound selected from the group consisting of compounds represented by Formulae 1b to 1d:

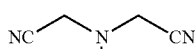

[Formula 1b]

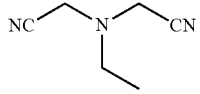

[Formula 1c]

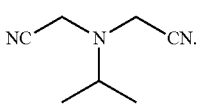

[Formula 1d]

4. A non-aqueous electrolyte solution for a lithium secondary battery, the non-aqueous electrolyte solution comprising:
   an ionizable lithium salt;
   an organic solvent; and
   an additive for a non-aqueous electrolyte solution,
   wherein the additive for a non-aqueous electrolyte solution comprises a compound represented by Formula 1:

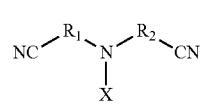

[Formula 1]

in Formula 1,

R$_1$ and R$_2$ are each independently a substituted or unsubstituted alkylene group having 1 to 5 carbon atoms, and X is hydrogen (H), a substituted or unsubstituted alkyl group having 1 to 6 carbon atoms, or —(R$_3$)$_n$—CN, wherein R$_3$ is a substituted or unsubstituted alkylene group having 1 to 3 carbon atoms, and n is an integer of 0 or 1.

5. The non-aqueous electrolyte solution for a lithium secondary battery of claim 4, wherein the additive for a non-aqueous electrolyte solution comprises at least one compound selected from the group consisting of compounds represented by Formulae 1a to 1h:

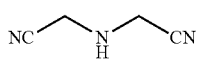

[Formula 1a]

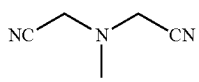

[Formula 1b]

-continued

[Formula 1c]

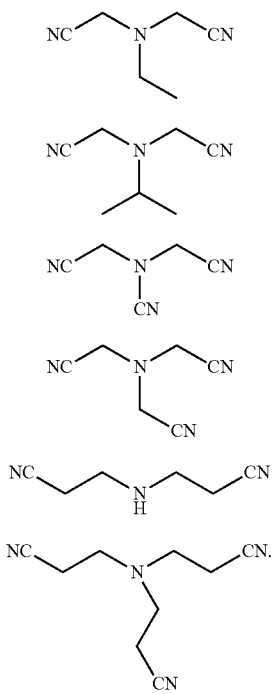

[Formula 1d]

[Formula 1e]

[Formula 1f]

[Formula 1g]

[Formula 1h]

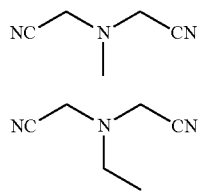

6. The non-aqueous electrolyte solution for a lithium secondary battery of claim 4, wherein the additive for a non-aqueous electrolyte solution comprises at least one compound selected from the group consisting of compounds represented by Formulae 1b to 1d:

[Formula 1b]

[Formula 1c]

[Formula 1d]

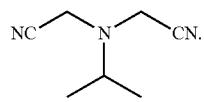

7. The non-aqueous electrolyte solution for a lithium secondary battery of claim 4, wherein the additive for a non-aqueous electrolyte solution is included in an amount of 0.5 wt % to 6 wt % based on a total amount of the non-aqueous electrolyte solution.

8. The non-aqueous electrolyte solution for a lithium secondary battery of claim 4, wherein the additive for a non-aqueous electrolyte solution is included in an amount of 1 wt % to 5 wt % based on a total amount of the non-aqueous electrolyte solution.

9. The non-aqueous electrolyte solution for a lithium secondary battery of claim 4, wherein the lithium salt comprises $Li^+$, as a cation, and any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

10. The non-aqueous electrolyte solution for a lithium secondary battery of claim 4, wherein the organic solvent comprises any one selected from the group consisting of an ether compound, an ester compound, an amide compound, a linear carbonate compound, or a cyclic carbonate compound, or a mixture of two or more thereof.

11. A lithium secondary battery comprising:
a negative electrode;
a positive electrode;
a separator disposed between the negative electrode and the positive electrode; and
a non-aqueous electrolyte solution,
wherein the non-aqueous electrolyte solution comprises the non-aqueous electrolyte solution for a lithium secondary battery of claim 4.

* * * * *

UNITED STATES PATENT AND TRADEMARK OFFICE
CERTIFICATE OF CORRECTION

PATENT NO. : 10,026,992 B2  
APPLICATION NO. : 15/341034  
DATED : July 17, 2018  
INVENTOR(S) : Sung Hoon Yu et al.

Page 1 of 1

It is certified that error appears in the above-identified patent and that said Letters Patent is hereby corrected as shown below:

On the Title Page

Insert:
--(30) Foreign Application Priority Data
Nov. 3, 2015 (KR).........10-2015-0154073--

Signed and Sealed this
Twenty-first Day of August, 2018

Andrei Iancu
*Director of the United States Patent and Trademark Office*